United States Patent [19]

Hurt et al.

[11] Patent Number: 5,311,271
[45] Date of Patent: May 10, 1994

[54] GOLF COURSE RANGE FINDER
[75] Inventors: David B. Hurt, Mountain View; Gregory R. Neal, Cupertino, both of Calif.
[73] Assignee: DME/Golf, Inc., Newport Beach, Calif.
[21] Appl. No.: 99,052
[22] Filed: Jul. 28, 1993

Related U.S. Application Data

[63] Continuation of Ser. No. 823,122, Jan. 21, 1992, abandoned.
[51] Int. Cl.$^5$ .............................................. G01C 3/08
[52] U.S. Cl. .......................................... 356/5; 356/4; 342/118
[58] Field of Search ................ 356/4, 5; 342/118, 125

[56] References Cited

U.S. PATENT DOCUMENTS

| | | |
|---|---|---|
| 3,053,134 | 9/1962 | Bjornson . |
| 3,433,203 | 3/1969 | Sharkey et al. . |
| 3,680,958 | 8/1972 | Von Bose . |
| 3,732,845 | 5/1973 | Istre . |
| 3,740,141 | 6/1973 | DeWitt, Jr. . |
| 3,778,159 | 12/1973 | Hines et al. . |
| 3,868,692 | 2/1975 | Woodard et al. . |
| 3,890,497 | 6/1975 | Rush . |
| 4,018,182 | 4/1977 | Knaack . |
| 4,057,030 | 11/1977 | Womack . |
| 4,088,324 | 5/1978 | Farmer . |
| 4,123,650 | 10/1978 | Hosoe et al. . |
| 4,136,394 | 1/1979 | Jones et al. . |
| 4,178,098 | 12/1979 | Asano et al. . |
| 4,308,537 | 12/1981 | Berry et al. . |
| 4,332,468 | 6/1982 | Stützle . |
| 4,344,705 | 8/1982 | Kompa et al. . |
| 4,367,949 | 1/1983 | Lavering . |
| 4,403,857 | 9/1983 | Hölscher . |
| 4,419,655 | 12/1983 | May . |
| 4,441,810 | 4/1984 | Momose et al. . |
| 4,470,664 | 9/1984 | Shirasawa .............................. 356/4 |
| 4,498,764 | 2/1985 | Bölkow et al. . |
| 4,518,255 | 5/1985 | Zuleeg . |
| 4,531,833 | 7/1985 | Ohtomo . |
| 4,538,907 | 9/1985 | Rocchi . |
| 4,559,445 | 12/1985 | Hedin et al. ......................... 356/5 X |
| 4,573,528 | 3/1986 | Trepaud . |
| 4,589,773 | 5/1986 | Ido et al. . |
| 4,606,629 | 8/1986 | Hines et al. . |
| 4,619,616 | 10/1986 | Clarke . |
| 4,666,157 | 5/1987 | Bodine et al. . |
| 4,675,816 | 6/1987 | Brandon et al. . |
| 4,678,194 | 7/1987 | Bowyer et al. . |
| 4,698,781 | 10/1987 | Cockerell, Jr. . |
| 4,699,508 | 10/1987 | Bölkow et al. . |
| 4,703,444 | 10/1987 | Storms, Jr. et al. . |
| 4,721,384 | 1/1988 | Dietrich et al. . |
| 4,730,190 | 3/1988 | Win et al. . |
| 4,752,799 | 6/1988 | Stauffer . |
| 4,849,781 | 7/1989 | Nakazawa et al. . |
| 4,864,515 | 9/1989 | Deck . |
| 4,901,073 | 2/1990 | Kibrick . |
| 4,905,624 | 3/1990 | Krolzick . |
| 4,913,546 | 4/1990 | Nagaoka et al. . |
| 4,922,307 | 5/1990 | Schaffer . |
| 4,928,152 | 5/1990 | Gerardin . |
| 4,938,588 | 7/1990 | Taniguchi . |
| 4,939,863 | 7/1990 | Alexander et al. . |
| 4,957,362 | 9/1990 | Peterson . |
| 4,986,653 | 1/1991 | Yokokura et al. . |
| 5,002,388 | 3/1991 | Ohishi et al. . |
| 5,046,839 | 9/1991 | Krangle . |
| 5,056,106 | 10/1991 | Wang et al. . |
| 5,082,276 | 1/1992 | Stevens . |
| 5,204,731 | 4/1993 | Tanaka et al. . |

OTHER PUBLICATIONS

Keuffel & Esser, Pulseranger Electronic Distance Measuring Instrument Maintenance Manual.
Robin H. Hines, Modern Utilization of Infrared Technology II, Proceedings of the Society of Photo-Optical Instrumentation Engineers, vol. 95, pp. 204-211, Aug. 1976.
RCA AN/GVS-5 RCA Government and Commercial Systems AD, 30 Aug. 1976, 356-5.

Primary Examiner—Mark Hellner
Attorney, Agent, or Firm—Knobbe, Martens, Olson & Bear

[57] ABSTRACT

A range finder for use on a golf course comprising a transceiver and a target. The transceiver emits a transmit beam along a transmission axis which is received by the target, and the target returns a return beam to the transceiver. A lens on the transceiver surrounds the transmission axis and focuses the return beam on a detector. Preferably, the lens has a dimension which is about twice the diameter of a retro-reflector mounted on the target.

8 Claims, 6 Drawing Sheets

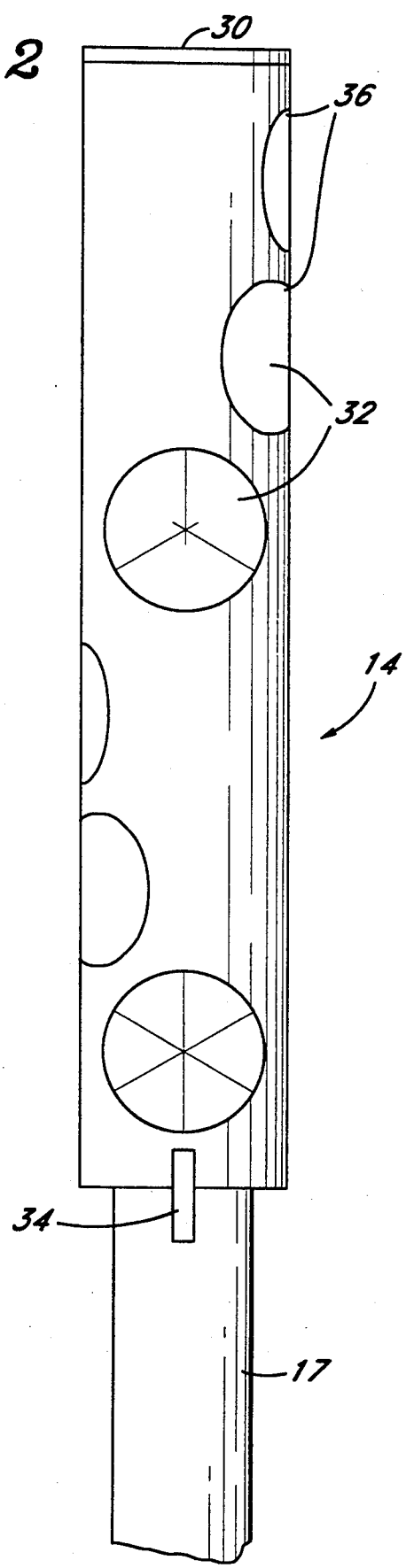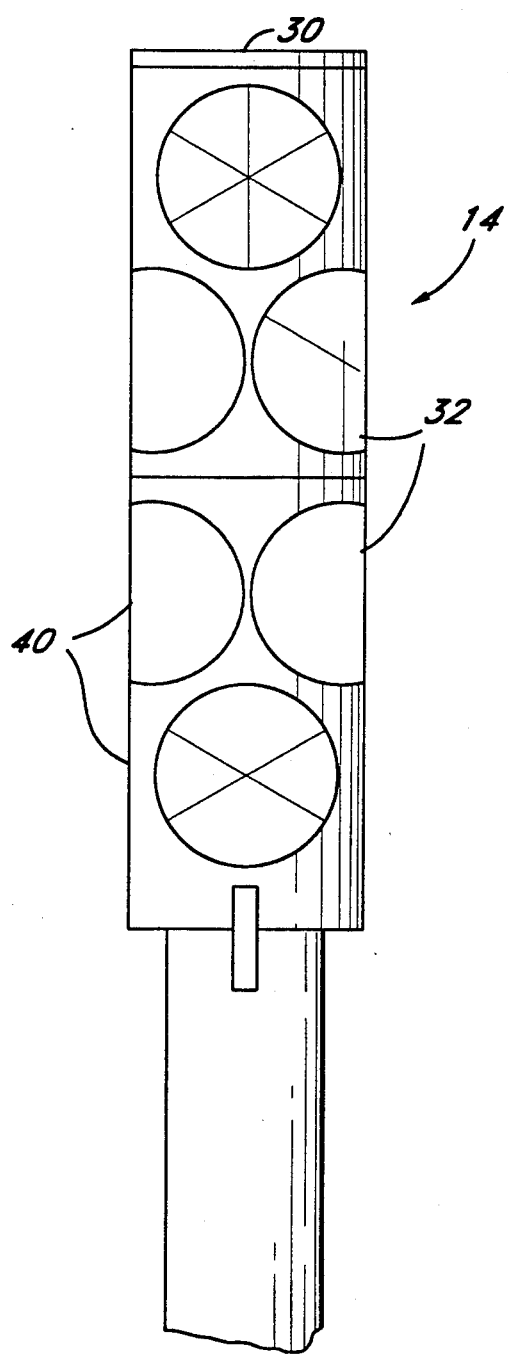

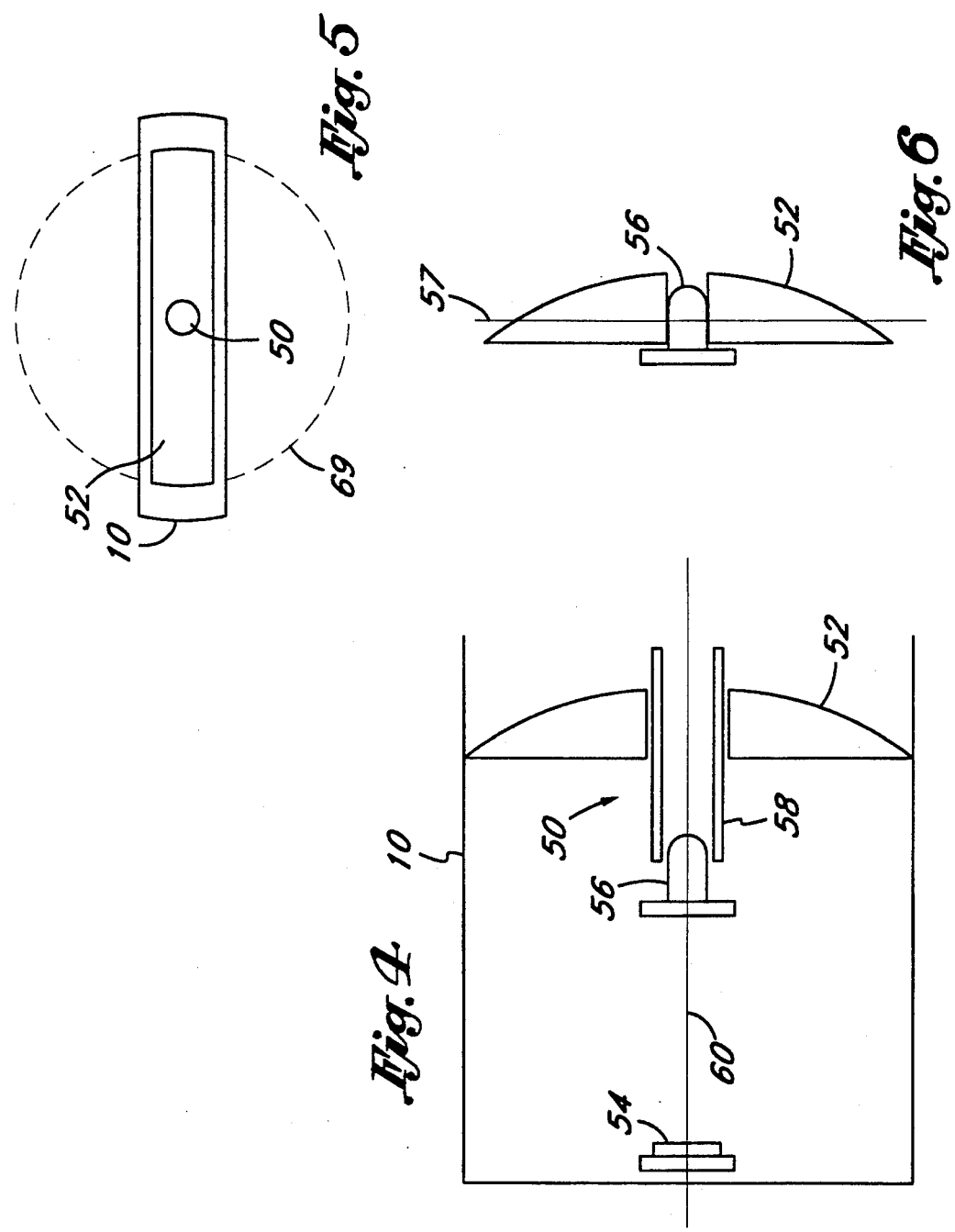

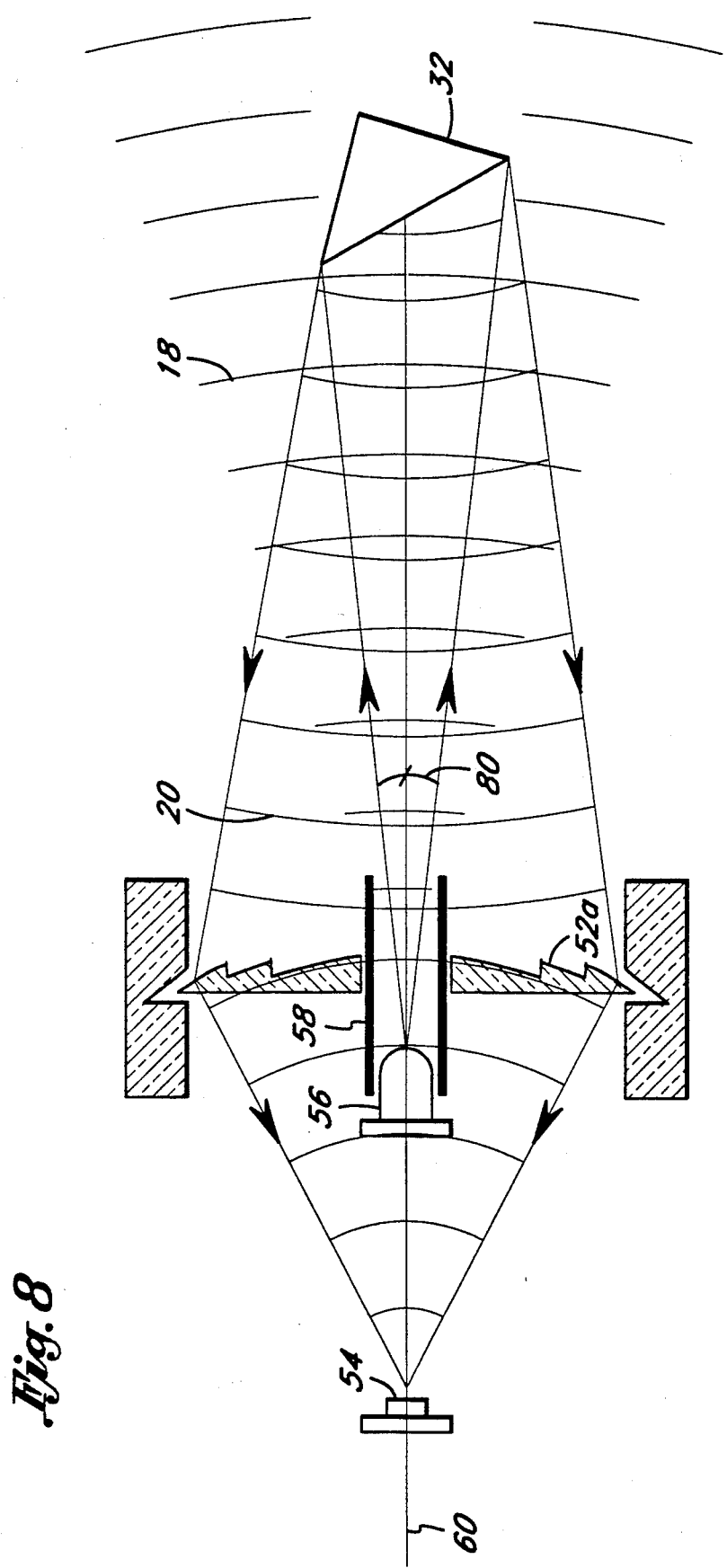

GOLF COURSE RANGE FINDER

This application is a continuation of application Ser. No. 07/823,122, filed Jan. 21, 1991, now abandoned.

FIELD OF THE INVENTION

The present invention relates to distance measuring devices. More specifically, the present invention relates to electromagnetic range finders for use in golfing.

BACKGROUND OF THE INVENTION

It is possible to measure distances between two locations with the use of electromagnetic signals. Devices which do such measuring are known in the art as "range finders." An electromagnetic transmit signal may be sent from a first location to a second, and an electromagnetic return signal may be immediately sent back. The time between the sending of the transmit signal and the receiving of the return signal (the "two way time of flight") may be measured. The two way time of f light may then be correlated to the distance between the two points. The distance can be calculated by multiplying the known velocity at which the electromagnetic signal travels by the two way time of flight.

A parameter which greatly affects the range and sensitivity of a distance measuring system is the amount of return signal which can be collected and utilized at the point of origin. The larger the collected signal, the greater the distance can be between the two locations while still making an accurate two way time of flight measurement. Thus, it is desirable to make use of as large a portion as possible of the return signal when measuring two way time of flight.

Additionally, in certain applications, it is desirable to measure distance between a second location and a first location where the first location lies in any arbitrary radial direction from the second. Under such circumstances, the apparatus at the second location must be capable of returning a signal to the first location no matter where the first location lies.

Accordingly, among other things, the present invention provides f or extremely efficient collection of the return signal used for measuring two way time of flight, thus greatly enhancing range and sensitivity of the range finding system. Such efficiency also permits the range finder to be small and portable, so that it is suitable for use in golfing.

SUMMARY OF THE INVENTION

The apparatus of the preferred embodiment accurately measures and displays the distance of a hand-held instrument from a remote reflection point. A modulated light beam generated by a transceiver comprising an optical source is directed in a narrow bean to specialized prism known as a retro-reflector. The return light from a retro-reflector is captured by the transceiver in a very efficient manner. A lens within the transceiver focuses an image of the retroreflector aperture on the active surf ace of a high-speed photodetector diode. The photodetector diode detects the light by means of the "photo-electric" effect to convert the reflected photons into electric current linearly proportional to the photon flux, thereby preserving the radio frequency modulation information of the returned beam. The delay of the returned modulated signal is equal to the "time-of flight." From the time-of-flight the distance can be calculated.

A key element in this invention concerns the specifics of the optical path one property of a retro-reflector is that it returns light back to the source. Additionally, except for some aberrations and path-loss attenuations, all of the light that impinges on the face of a retro-reflector is returned to the source in a cone-shaped beam. The diameter of the returning light beam that reaches the source will be exactly twice the size of the aperture of the retroreflector itself, regardless of the distance between the transceiver and the retro-reflector. In the preferred embodiment, the source is disposed in the center of a receiving element such as a lens, the diameter of which two times that of the retro-reflector. With this arrangement, the returned light will completely fill the receiving element regardless of the distance. Therefore, the distance measuring instrument of the present invention uses a highly efficient optical path, which permits the dimensions of the device to be small so that it may be hand held.

According to the present invention, a range finder system is provided. Although other applications are envisioned and within the scope of the invention, the preferred embodiment may be used in a golf course environment to accurately measure the distance between the golfer and the hole, hazards and the like. The preferred embodiment comprises a battery powered, hand-held transceiver sized to be conveniently carried by the golfer, and a target on a pole positioned at each location, such as holes, to which a distance measurement might be desired. In the preferred embodiment, the electromagnetic signals used for measuring have optical frequencies and are therefore light beams.

Aspects of the present invention provide a target capable of returning a signal in any direction radially from the target within a predetermined angle of acceptance up and down. Such arrangement allows the golfer, for example, to determine his or her distance from any arbitrary location on the course. The 360° return angle is accomplished in the preferred embodiment by arranging a plurality of individual signal returners, such as cube corners, in a manner so that their individual angles of acceptance overlap to provide 3600 coverage.

Additional aspects of the present invention provide enhanced range and sensitivity of the range finding system. The enhanced range and sensitivity allows accurate measurements at relatively long distances. In the preferred embodiment the enhanced range and sensitivity is obtained by arranging transceiver components to effectively collect the optical return signal (i.e., light beam). The arrangement includes a transmitter such as an optical source (e.g., LED), a return signal focuser such as a lens and a receiver such as a photodetector, all disposed along a transmission axis which is the path the transmit and return signals travel. The transmission axis is perpendicular to and passes through the center of the lens. Thus, the lens surrounds the transmission axis. The arrangement causes virtually all of the light returned from a cube corner to be focussed onto the detector of the transceiver.

The efficient collection of the optical return signal in the preferred embodiment allows the size of the lens of the transceiver to be minimized. Thus, an effective transceiver can be constructed to fit comfortably in the palm of a hand.

The preferred embodiment of the present invention provides enhanced sensitivity and range without the need to narrowly collimate the optical transmit beam.

Consequently, the somewhat spatially broad transmit bean eliminates the need to point the transceiver precisely toward the target in order to obtain a measurement.

Further in accordance with aspects of the present invention, the invention comprises a golf course range finder for determining the distance between a golfer upon a fairway and a topological feature of the golf course, such as a putting green. The range finder comprises a pole having a target thereon and a hand-held battery-powered transceiver, sized for use by the golfer. The transceiver has an optical source which emits a directional optical transmit beam that can be directed by the golfer at the target in a direction generally radial to the pole. The target receives a radially directed transmit beam and is responsive to the transmit beam independent of the radial direction along which the transmit beam is directed by the golfer. The target responds, returning an optical return bear to the transceiver upon receipt of the transmit beam. The transceiver includes an optically responsive detector which detects the return beam, as well as a distance measuring circuit electrically coupled to the detector.

Additionally, in accordance with aspects of the present invention, the invention comprises a distance measuring system. The system includes a target having a signal returner which receives an electromagnetic transmit signal incident thereon, and responsively returns an electromagnetic return signal. The system further includes a transceiver comprising a return signal focuser, a transmitter and a receiver, the transmitter transmitting the electromagnetic transmit signal along a transmission axis, the return signal focuser surrounding the transmission axis.

Also in accordance with aspects of the present invention, the invention comprises a range finding apparatus comprising a target comprising a retro-reflector which reflects optical radiation incident thereon along the same path as the incident radiation. The system further includes a transceiver having an optical source which emits the optical radiation incident on the retro-reflector along a transmission axis. The transceiver comprises an optical receiving element having a cross-sectional dimension about twice that of the retro-reflector, the receiving element surrounding the transmission axis.

Furthermore, in accordance with aspects of the present invention, the invention comprises, in a golf course range finding system, a target comprising a pole having a cylindrical portion and a plurality of retro-reflectors spaced circumferentially around said cylindrical portion.

The objects and features of the present invention will become apparent with the following descriptions of the preferred embodiments taking reference to the accompanying drawings, in which:

FIG. 3 is a side view of an alternative target of the preferred embodiment of the present invention.

FIG. 4 is a cutaway view of the transceiver of the preferred embodiment of the present invention showing transceiver optics.

FIG. 5 is the front end view of the transceiver of the preferred embodiment of the present invention.

FIG. 6 is a top view of lens and optical source arrangement in dance with the present invention.

FIG. 7 a blocked diagram schematic of the transceiver of the present invention, showing signal processing.

FIG. 8 is a schematic showing the operation of the beam transmission and collection optics of the preferred embodiment of the present invention.

Figure 9:
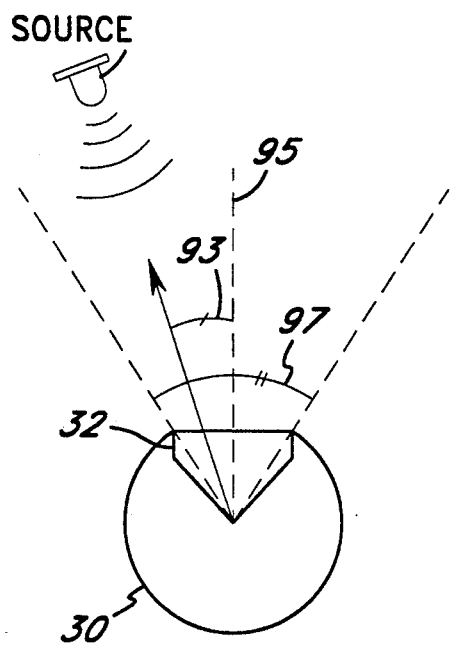

FIG. 9 is a graphically illustration demonstrating characteristics of a cube corner.

Figure 10:
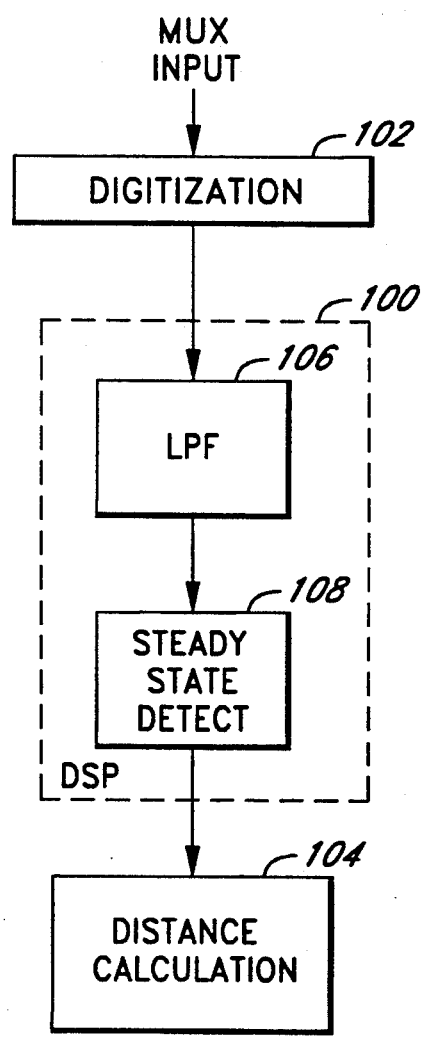

FIG. 10 is a block diagram schematic illustrating the digital signal processing apparatus of the preferred embodiment of the present invention.

DETAILED DESCRIPTION OF THE PREFERRED EMBODIMENT

Figure 1:
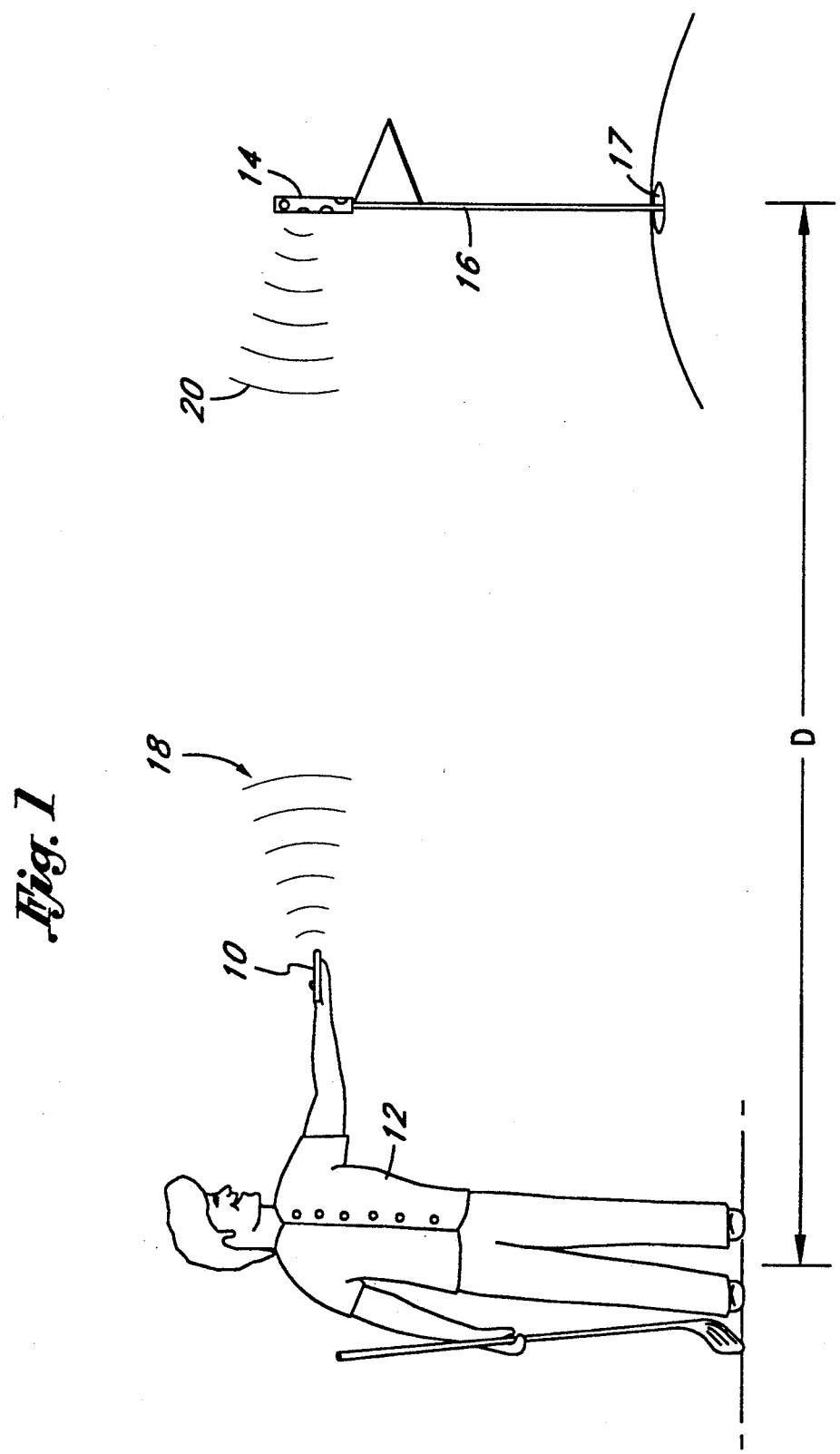
FIG. 1 illustrates a typical environment of the preferred embodiment of the present invention.

As shown in FIG. 1, hand held battery powered transceiver 10, sized for use by a golfer, is held by a golfer 12. A target 14 is mounted at a location from which a golfer might want to know his or her distance D, such as a pole 16 which in the preferred embodiment comprises a flat stick that extends from a cup on a green 17. Other target locations, including hazards and the like, are anticipated and within the scope of application of the present invention.

The transceiver 10 is pointed by the golfer 12 in the direction of the target 14 and a directional optical transmit beam 18 (represented as successive arcs) is transmitted in a direction radial to the target. The optical transmit beam 18 is incident upon the target 14. Subsequently, an optical return beam 20 (represented as successive arcs) is returned to the transceiver 10.

It will be understood by one of ordinary skill in the art that in the preferred embodiment the target may be mounted in any convenient location which allows line of sight access.

Figure 2:
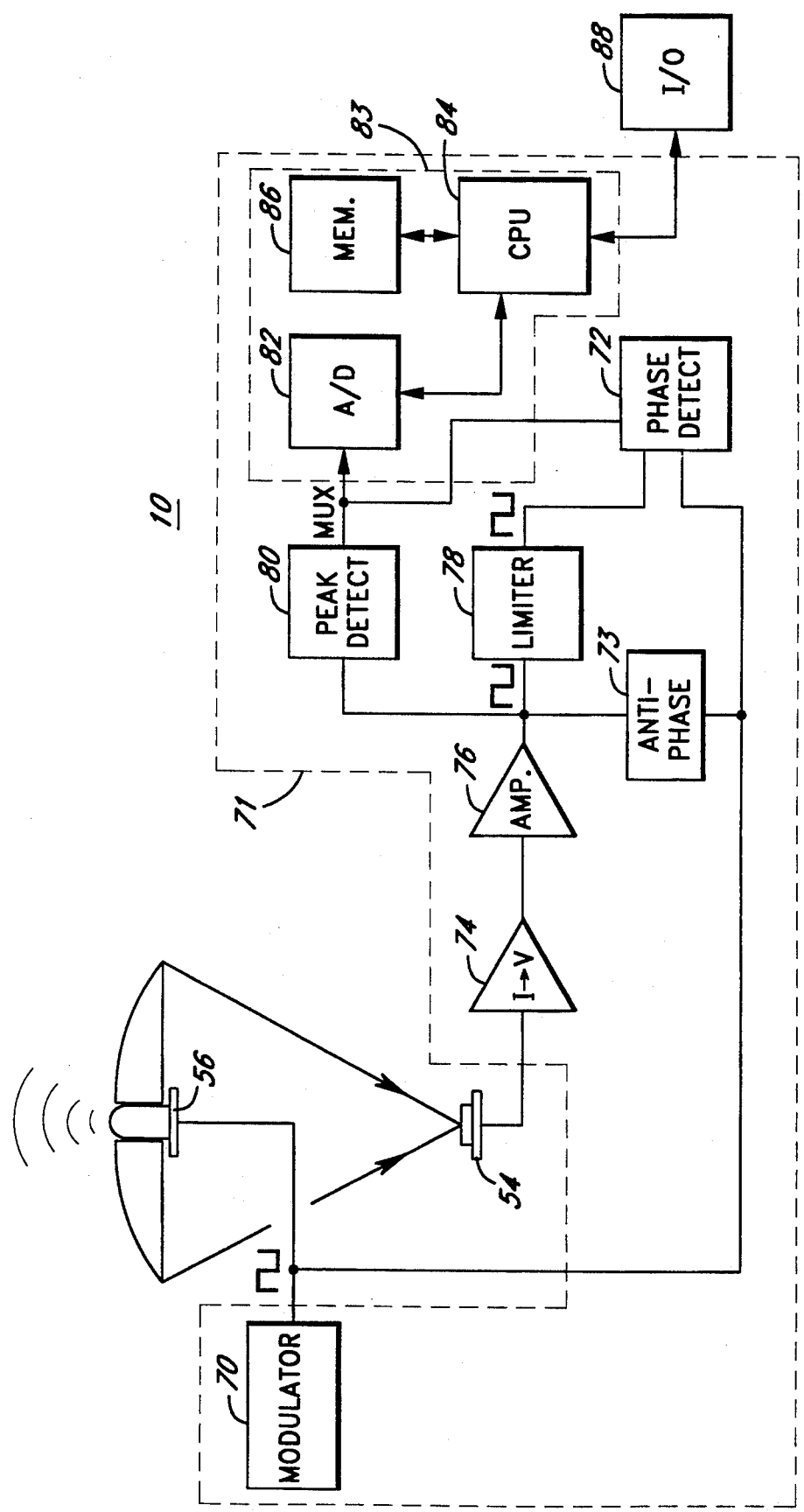
FIG. 2 is a side view of the target of the preferred embodiment of the present invention.

FIG. 2 illustrates the target 14 of the preferred embodiment. The target 14 comprises a cylindrical polypropylene rod 30 and a plurality of signal returners such as retro-reflectors 32. In the preferred embodiment a "cube corner" retro-reflector is used. However, it will be understood that any type retro-reflector, including Total Internal Reflectors (TIRS) and "Cat's Eye" reflectors will suffice. In the exemplary configuration shown in FIG. 2, the target 14 is mounted at the top of the pole 17. A connector 34 lies along the central axis of the pole 17 and the target 14, extending into each, so as to fasten the target 14 to the pole 17.

Holes 36 are cut through the cylindrical rod 30 of the target 14 so that the cube corners 32, which have a circular cross section at their face, may be mounted in the rod 30. In the preferred embodiment, the cube corners 32 are spaced around the circumference of rod 30 at approximately 60 intervals. The cube corners 32 are spaced above one another so that they are longitudinally offset as they progress around the rod 30. Such spacing allows the rod 30 to be relatively narrow in diameter, while still containing six cube corners 32.

FIG. 3 illustrates an alternate preferred embodiment of the target 14, wherein twelve cube corners 32 are employed. The embodiment shown in FIG. 3 comprises four layers 40 of three cube corners 32 each. In each layer, the cube corners 32 are spaced at 120° intervals around the rod 30. The cube corners 32 of each layer 40 are circumferentially offset from the adjacent layer by 60°. The preferred embodiment of FIG. 3 utilizes a somewhat larger diameter rod 30, but allows two cube corners 32 in each layer 40 of the target 14.

It will be recognized by one of ordinary skill in the art that the of target 14, is constructed by boring holes 36 for mounting cube corners 32. Furthermore, it will be understood by those skilled in the art that the invention is not limited to the target configurations shown in FIGS. 2 and 3. For example, reflectors other than cube corners may be employed, and their arrangement may vary. Additionally, the location of the target 14 is not restricted to the top of a pole.

Referring to FIG. 4, the optical components of the transceiver 10 comprise a transmitter 50 including an optical source 56 (e.g., a visible or infrared LED), a return signal focuser such as an optical lens 52 and a receiver such as a photodetector 54.

As shown in FIG. 4, light from the source 56 is emitted along a transmission axis 60. In the preferred embodiment of the present invention, the transmission axis 60 passes perpendicular to and through the center of the lens 52. Thus, the lens 52 surrounds the transmission axis 60. The transmitter 50 and the detector 54 are each aligned along the transmission axis 60 as shown.

In the preferred embodiment, the transmitter 50 comprises an optical source comprising an infrared light emitting diode (LED) 56, which emits light in a generally conical beam that diverges about 1.5 degrees on either side of the axis 60. Additionally, the transmitter 50 comprises optical shield 58, comprising a tube with an inner surface which at least partially absorbs stray infrared electromagnetic energy. The shield 58 is perpendicular to and passes through the center of lens 52. The optical source 56 is mounted at the rear of the shield 58 such that an electromagnetic transmit signal, comprising an optical beam emitted by the optical source 56, is transmitted along the transmission axis 60.

In the preferred embodiment, the lens 52 has a hole in its center, allowing for the mounting of the shield 58. The embodiment of FIG. 4 uses a planoconvex lens. However, alternate preferred embodiments include the substitution of a convex-convex and a Fresnel lens. Furthermore, it will be understood that other focusing apparatus may be utilized.

As illustrated in FIG. 5, in the preferred embodiment, the lens 52 is a rectangular portion of a planoconvex lens. One notable feature of lens 52 is that its largest dimension is approximately two times the largest dimension of the retro-reflector 32. In the preferred embodiment, the diameter of the reflector 32 is 1 inch, and the dimensions of the lens 52 are 2 inches by ¾ inches. The reason for and advantages of the relative sizes of lens and reflector will be addressed in more detail below.

The rectangular shape for lens 52 allows the transceiver 10 to be formed as a generally rectangular box which can be conveniently carried by a golfer. Nevertheless, it will be understood by those skilled in the art that any shape, including a circular lens as suggested by phantom line 69, may be employed.

Returning to FIG. 4, in the preferred embodiment the receiver comprises an optically responsive detector such as the photodetector 54. The detector 54 is disposed substantially at the focal point of the lens 52.

FIG. 6 illustrates an alternative embodiment wherein the optical source 56 (comprising the transmitter) is mounted directly in the center of the lens 52, without the shield 58. In this embodiment, the optical source 56 lies in the latitudinal plane 57 of the lens, whereas in the embodiment of FIG. 4, the source 56 is behind the plane 57. However, in both embodiments, the transmitter is centered in and surrounded by the lens 52.

As shown in FIG. 7, the electronics within transceiver 10 comprises processing circuitry 71. A central processing unit 84, memory section 88 and analog to digital converter 82, comprise a distance measuring circuit 83. Referring to FIG. 10, the elements of distance measuring circuit 83 cooperate to comprise a digital signal processor 100, a digitization unit 102, and a distance calculation unit 104. The digital signal processor 100 comprises a digital low pass filter 106 and a steady state detector 108.

Referring again to FIG. 7, in the preferred embodiment, an output of a modulator 70 is electrically coupled to the optical source 56. Additionally, the output of the modulator 70 is electrically coupled to a first input of a phase detector 72 and an input of an anti-phase circuit 73. An output of the anti-phase circuit 73 is coupled to an input of a limiter 78.

Furthermore, an output of the photodetector 54 is electrically coupled to an input of a current-to-voltage converter 74. An output of the current-to-voltage converter 74 is electrically coupled to an input of an amplifier 76. An output of the amplifier 76 is coupled to the input of the signal limiter 78 and an input of a peak detector 80. An output of the signal limiter 78 is electrically coupled to a second input of the phase detector 72.

Additionally, an output of the phase detector 72 is coupled to an input of the analog-to-digital converter 82. Also, an output of peak detector So is coupled to the input of the analog-to-digital converter 82. A CPU 84, the analogto-digital converter 82, a memory section 86 and an input/output section 88 are coupled in that they all share appropriate data and address buses, as is well known in the art.

As briefly discussed previously, the preferred embodiment of the present invention operates in a golf course environment as illustrated in FIG. 1. At any point in the golf game, particularly after hitting a tee shot, the golfer 12 may wish to know his or her distance from a designated location at which a target 14 is located.

To employ the golf range finding system, the golfer 12 points the transceiver 10 in the general direction of the target 14. The golfer 12 then causes the transceiver 10 to transmit the optical transmit beam 18 toward the target 14. The target 14 instantaneously returns the optical return beam 20 toward the transceiver 10. Electronics in transceiver 10 measure the round trip time of flight, which is the time the optical transmit beam 18 takes to get from the transceiver 10 to the target 14, plus the time the optical return beam 20 takes to get from the target 14 back to the transceiver 10. The distance between the transceiver 10 and the target 14 is then calculated from the two way time of flight measurement. After the golfer knows the distance to the target, he can select a proper club based on that distanc , and hit his next shot.

Turning now to a more detailed discussion of the operation of the preferred embodiment, FIG. 2 illustrates target 14 of the preferred embodiment, comprising a plurality of cube corners 32, as previously discussed. As is well known in the art, cube corners have the optical property of returning substantially all light incident upon them back in the precise direction of origin. It is also well known that conventional cube corners have a predetermined angle of acceptance through which their reflection properties are effective.

As shown in FIG. 9, light arriving at a cube corner 32 along the transmission axis 60 has an angle of an incidence 93 which is the angle between centerline 95 of the cube corner and the transmission axis of the source. Each cube corner has an angle of acceptance 97 within which the arriving beam will be reflected, but outside of which no substantial reflection occurs. As can be seen, the cube corner 32 will properly reflect the incoming light back to the source so long as the angle of incidence 93 remains less than half of the angle of acceptance of acceptance 97. Although FIG. 9 is a two-dimensional view, it will be understood by one of ordinary skill that in three dimensions the angle of acceptance 97 defines a cone of acceptance.

The cube corners employed in the preferred embodiment of the present invention have an angle of acceptance 97 of approximately 65°-75°. Thus, as shown in FIG. 2, when the cube corners 32 are spaced around the target 14 at 60° intervals, all 360 degrees around the circumference of the target are covered. Because the cube corner's actual angle of acceptance takes the shape of a cone, the cube corners' angle of acceptance 97 is applicable up and down, as well as side to side. Accordingly, the target can also effectively reflect within an angle of about 30° above and 30° below a plane perpendicular to and passing through the target.

The same theories can be carried to the alternative preferred embodiment shown in FIG. 3. In FIG. 3, 360° coverage is obtained with the 4-layer (layers 40) arrangement previously described. Additionally, in the embodiment shown in FIG. 3, the cube corners are arranged with two cube corners facing in the same radial directions such that multiple pairs of cube corners have parallel centerlines 95. Thus, twice the light can be reflected back, enhancing range and sensitivity of the system, as will be described in more detail below.

It will be understood by one of ordinary skill in the art that various devices and apparatus may be substituted for cube corners 32 to provide the same function.

Turning now from the operation of the target 14 to the operation of the transceiver 10, several advantages of the present invention will now be discussed. FIG. 8 illustrates the operation of the optics included in the transceiver, in cooperation with one of the cube corners 32 of the target 14, shown from the top. In FIG. 8, lens 52a is drawn as a Fresnel lens.

As illustrated in FIG. 8, the transceiver is pointed at the target so that the optical transmit beam 18 transmitted by the optical source 56, along the transmission axis 60, through the shield 58 is within the predetermined angle of acceptance of a cube corner 32. Beam 18 will diverge at a predetermined angle 80, and thus, the closer the source 56 is to the target the greater the intensity of light striking the target. The portion of the beam 18 which enters cube corner 32 is reflected back, as optical return beam 20, along axis 60 having the same divergence angle as the angle 80. Since the optical return beam 20 will travel the same distance as the optical transmit bean 18 did, the part of the beam incident on cube corner 32 and sent back will disperse again as much. In effect, the beam width reaching the transceiver 10 will be twice as wide as the face of the cube corner. According to this principle, the beam width of optical return signal 20 will never be wider than twice the width of the cube corner face (not taking into account error in the shape of the cube corner which may disperse the beam some amount further).

The present invention, then, takes advantage of the described optical behavior of the cube corner to effectively collect a maximum amount of the return optical signal 20. The preferred embodiment of the present invention aligns or centers the optical source 56, the lens 52 and the photodetector 54 along the transmission axis 60, the lens 52 surrounding the axis 60. Thus, the lens 52 need be no more than approximately twice the width of the face of cube corner 32. Furthermore, by placing the detector 54 at the focal point of the lens 52, virtually all of the optical return signal 20 is focused upon the detector 54.

Although as illustrated in FIG. 5, the preferred embodiment uses only a rectangular portion of a lens, the rectangle has its largest dimension equal to approximately twice the largest dimension of cube corner 32. It will be understood by one skilled in the art that a full circular lens may be used to collect virtually all of the optical return beam 20. The rectangular shape of lens 52 is advantageous for golf course use in that it permits the transceiver to be of a compact size and convenient shape.

An additional operational feature illustrated by FIG. 8 is that the optical transmit beam 18 is not severely collimated. Since the invention efficiently collects the optical return beam 20, a broader outgoing beam 18 is acceptable while still maintaining required range and sensitivity. A broader outgoing bean 18 is advantageous because the golfer need not point the transceiver 10 directly toward the target 14 in order to obtain a range measurement. In this regard, it should be noted that the shield 58 does not severely collimate the beam 18, and that its principal function is to absorb stray emissions from the source 56 which might interfere with the measurement, as well as provide structural support for the source 56. Accordingly, although two embodiments are shown, the embodiment including the shield 58 is preferred over that shown in FIG. 6, having no shield.

In the preferred embodiment of the present invention, the two way time of flight measurement is accomplished utilizing phase shift detection which is well known in the art. FIG. 7 is a schematic block diagram showing the elements of the transceiver used to make the distance measurement of the range finder system. A modulator 70 amplitude modulates the optical source 56 with a square wave as shown in FIG. 7. The optical return beam 20 returning and being focused on the detector 54 is a signal of the same frequency but shifted in phase by the amount of time required for the signal to get to the target and back. This "two way time of flight" can be correlated to distance by the central processing unit 84.

The detector 54 comprises a photodiode which produces current proportional to the intensity of light striking its surface. The detector 54 is coupled to the current-to-voltage converter 74 such that the converter 74 produces an electrical signal version of the incoming signal.

The current-to-voltage converter 74 is coupled to the amplifier 76 such that the incoming signal is amplified at the output of the amplifier 76 to a level which can be utilized by the remainder of the circuit. The output of the amplifier 76 is coupled to the input of the limiter 78. The limiter 78 serves to size and shape the signal provided by the amplifier 76 so that its phase can be compared with the outgoing signal generated by the modulator 70.

Additionally, the output of the amplifier 76 is coupled to the input of the peak detector 80. The peak detector 80 generates a voltage at its output which is proportional to the amplitude of the incoming signal. Information related to the strength of the incoming signal is thus made available.

As is understood in the art, the amplitude of a signal effects the rate at which it propagates through electronic circuitry. Accordingly, there will be some phase shift introduced to the incoming signal by the transceiver's circuitry which depends on the amplitude of the incoming signal. With the amplitude information available from the peak detector So the central processing unit 84 corrects for this added phase shift which depends on amplitude. In the preferred embodiment, a correction curve is stored in memory 86 which contains amounts of phase shift to be subtracted depending upon amplitude.

Additionally, the central processing unit 84 of the distance measuring circuit uses the amplitude information to determine if a valid measurement has been made. For example, if the distance calculated from the phase difference between the outgoing signal and incoming signal (adjusted to compensate for the circuitry delay discussed above) is great yet the amplitude of the incoming signal is high, an erroneous measurement is indicated. Thus, by comparing the actual amplitude with the expected amplitude, the preferred embodiment ensures that the measured distance is valid. If the comparison indicates that the detected amplitude is not within a predetermined expected range based on the measured distance, an error signal is displayed to indicate that the measured distance is erroneous.

The modulator 70 provides the outgoing square wave to a first input of phase detector 72. As previously discussed, the limiter 78 provides a facsimile of the incoming signal to a second input of phase detector 72. The phase detector 72 generates a voltage at its output which is proportional to the difference in phase between the signal at its first input and the signal at its second input.

Both the amplitude signal provided by the peak detector 80 and the phase signal provided by the phase detector 72 are provided to the analog-to-digital converter 82. The two signals are multiplexed to the input of the analog digital converter 82 such that either signal can be digitized at any predetermined time. The central processing unit 84 controls the analog-to-digital converter thus gathering either amplitude or phase difference information at predetermined times. The memory section 86 contains programming and memory work space to allow the central processing unit 84 to calculate distance from the phase and the amplitude information.

Note that an interference subtraction feature is incorporated by the anti-phase circuit 73. Potentially, some of the outgoing square wave signal generated by the modulator 70 leaks into the circuitry path of the incoming signal. Such interference may corrupt amplitude and phase measurements. Therefore, the signal generated by modulator 70 is reversed in phase and level adjusted to cancel out the signal which leaks into the incoming signal circuitry. Thus, more accurate measurements are made.

Additionally, it has been found that spurious noise may leak into both the amplitude signal provided by detector 80 and the phase signal provided by detector 72, from unknown sources. The distance measuring circuit 83 comprises the apparatus shown in FIG. 10 which is used to eliminate the spurious noise. In particular, the amplitude signal and the phase signal are multiplexed into digitization unit 102 so that either signal may be digitized at a predetermined time. Once digitized, the digital signals can be processed by the digital signal processor 100. The digital low pass filter 106 of processor 100 removes high frequency spurious noise from the digital amplitude and phase signals. Additionally, the steady state detector 108 identifies periods of stability of the respective amplitude and phase signals which provide valid data that may then be used to calculate distance by the distance calculation unit 104.

Input/output 88 provides user interface such as an LCD or LED read-out as well as a button f or activating the transmitter and a beeper for indicating target acquisition.

Those skilled in the art will readily appreciate that there are many obvious modifications to the disclosed invention that would not appreciably affect the desired, improved result. Accordingly, all such modifications are intended to be included within the scope of this invention.

I claim:

1. A gold course range finding apparatus for determining the distance between a golfer on a fairway and a topological feature of the golf course, said range finding apparatus comprising:
   a target having a signal returner which receives an electromagnetic transmit signal incident thereon and responsively returns an electromagnetic return signal;
   a transceiver comprising a return signal focuser comprising an optical lens, said transceiver further comprising a transmitter and a receiver, said transmitter transmitting said electromagnetic transmit signal along a transmission axis, said return signal focuser surrounding said transmission axis; and
   wherein said transmitter further comprises a tubular shield, said shield passing through said lens and having a longitudinal axis coincident with said transmission axis and perpendicular to a latitudinal plane of said lens.

2. A golf course range finding apparatus for determining the distance between a golfer on a fairway and a topological feature of the golf course, said range finding apparatus comprising:
   a target having a signal returner which receives an electromagnetic transmit signal incident thereon and responsively returns an electromagnetic return signal;
   a transceiver comprising a return signal focuser, a transmitter and a receiver, said transmitter transmitting said electromagnetic transmit signal along a transmission axis, said return signal focuser surrounding said transmission axis;
   wherein said receiver converts said return signal to an electrical signal, said transducer further comprising a signal processing circuit utilizing said electrical signal to determine the distance between said target and said transceiver;
   wherein said signal processing circuit comprises:
      an amplitude modulator electrically coupled to said transmitter;
      a phase detector having a first input and a second input, said phase detector electrically coupled at said first input to said amplitude modulator and said phase detector coupled at said second input to said return signal receiver, said phase detector providing information indicative of the phase difference between said electromagnetic transmit signal and said electromagnetic return signal;

a return signal amplitude detector electrically coupled to said receiver, said amplitude detector providing information indicative of the amplitude of said electromagnetic return signal; and a distance measuring circuit comprising an analog-to-digital converter, a microprocessor and memory.

3. The apparatus of claim 2, wherein said distance measuring circuit further comprises:

a digitization unit which digitizes said electrical amplitude signal and said electrical phase signal, said digitization unit providing a digital amplitude signal and a digital phase signal, respectively; and a digital signal processor which filters said digital amplitude signal and said digital phase signal to suppress spurious noise in said digital amplitude signal and said digital phase signal.

4. The apparatus of claim 3, wherein said digital signal processor comprises a low pass filter which filters said digital signals.

5. The apparatus of claim 3, wherein said digital signal processor comprises a steady state detector, said steady state detector sensing said signals to identify per of stability in said signals.

6. The apparatus of claim 3, wherein said distance measuring circuit further comprises means for comparing said digital amplitude signal with an expected amplitude corresponding to the distance measured by said distance measuring circuit to determine whether the measured distance is valid.

7. The apparatus of claim 3, wherein said distance measuring circuit further comprises means for correcting said digital phase signal by subtracting a phase shift amount, the magnitude of said phase shift amount being dependent upon the magnitude of said digital amplitude signal.

8. A golf course range finding apparatus for determining the distance between a golfer on a fairway and a topological feature of the golf course, said range finding apparatus comprising:

a target having a signal returner which receives on electromagnetic transmit signal incident thereon and responsively returns an electromagnetic return signal;

a transceiver comprising a return signal focuser, a transmitter and a receiver, said transmitter transmitting said electromagnetic transmit signal along a transmission axis, said return signal focuser surrounding said transmission axis, said receiver converting said return signal to an electrical signal, said transceiver further comprising a signal processing circuit connected to said receiver, said signal processing circuit utilizing said electrical signal to determine the distance between said target and said transceiver, said signal processing circuit comprising a return signal amplitude detector electrically coupled to said receiver, said amplitude detector providing information indicative of the amplitude of said electromagnetic return signal, said signal processing circuit comparing said amplitude with a reference value to determine if the amplitude of said electromagnetic return signal is within a range of amplitudes.

* * * * *

UNITED STATES PATENT AND TRADEMARK OFFICE
CERTIFICATE OF CORRECTION

PATENT NO. : 5,311,271
DATED : May 10, 1994
INVENTOR(S) : David B. Hurt et al.

It is certified that error appears in the above-indentified patent and that said Letters Patent is hereby corrected as shown below:

```
In Column 10, at line 54, change "transducer" to --transceiver--.

In Column 10, at line 55, after "circuit" add --connected to said
    receiver, said signal processing circuit--.

In Column 11, at line 23, change "per" to --periods--.

In Column 12, at line 9, change "on" to --an--.
```

Signed and Sealed this

Thirteenth Day of September, 1994

Attest:

BRUCE LEHMAN

Attesting Officer

Commissioner of Patents and Trademarks